(12) United States Patent
Zhang et al.

(10) Patent No.: US 8,838,070 B2
(45) Date of Patent: Sep. 16, 2014

(54) METHOD OF AND SYSTEM FOR DATA ACCESS OVER DUAL DATA CHANNELS WITH DYNAMIC SIM CREDENTIAL

(75) Inventors: David Xining Zhang, San Jose, CA (US); Huiyue Xu, Beijing (CN); Xiaohua Yuan, Beijing (CN)

(73) Assignee: Aicent, Inc., San Jose, CA (US)

( * ) Notice: Subject to any disclaimer, the term of this patent is extended or adjusted under 35 U.S.C. 154(b) by 0 days.

(21) Appl. No.: 13/613,698

(22) Filed: Sep. 13, 2012

(65) Prior Publication Data

US 2013/0065557 A1 Mar. 14, 2013

Related U.S. Application Data

(60) Provisional application No. 61/534,230, filed on Sep. 13, 2011.

(51) Int. Cl.
H04M 1/66 (2006.01)
H04L 29/06 (2006.01)
H04W 12/06 (2009.01)

(52) U.S. Cl.
CPC .......... *H04W 12/06* (2013.01); *H04L 63/0884* (2013.01); *H04L 63/0853* (2013.01)
USPC ....................................................... 455/411

(58) Field of Classification Search
USPC .............. 455/413, 411, 450, 432.1, 466, 427, 455/558, 456.1, 406, 557, 405
See application file for complete search history.

(56) References Cited

U.S. PATENT DOCUMENTS

| | | |
|---|---|---|
| 6,308,267 B1 | 10/2001 | Gremmelmaier |
| 6,466,804 B1 | 10/2002 | Pecen et al. |
| 6,978,157 B1 | 12/2005 | Amiens |
| 7,065,340 B1 | 6/2006 | Einola |
| 7,171,460 B2 | 1/2007 | Kalavade et al. |
| 7,359,704 B1 | 4/2008 | Dizdarevic et al. |
| 2002/0187777 A1 | 12/2002 | Osterhout et al. |
| 2003/0214958 A1 | 11/2003 | Madour et al. |
| 2004/0005886 A1 | 1/2004 | Oda et al. |
| 2005/0220139 A1 | 10/2005 | Aholainen |
| 2006/0251008 A1 | 11/2006 | Wu et al. |
| 2007/0019580 A1 | 1/2007 | Zhang et al. |
| 2007/0019623 A1 | 1/2007 | Alt et al. |
| 2007/0117577 A1 | 5/2007 | Harris |
| 2007/0178885 A1 | 8/2007 | Lev |
| 2007/0183363 A1 | 8/2007 | Liden |

(Continued)

OTHER PUBLICATIONS

D. Bendor, OutSmart, North America, "FMC: A Driving Trend," Pipeline, vol. 2, Issue 1, Jun. 2005, Pipeline Publishing LLC, pp. 1-2.

(Continued)

*Primary Examiner* — Kiet Doan
(74) *Attorney, Agent, or Firm* — Haverstock & Owens LLP

(57) ABSTRACT

A method and apparatus provide access to communication services using dynamically assigned user credentials. The method includes establishing a communication connection with a first communication network (such as GSM, UMTS, CDMA, or LTE networks) using a real user credential (e.g., a SIM, a USIM, or an R-UIM card or certificates) in a first communication module, utilizing the first communication connection to request the dynamically assigned user credential from a remote management system, and registering a second communication module into the second communication network. The second communication connection is then tethered to allow other devices to access the Internet or other network.

11 Claims, 5 Drawing Sheets

(56) References Cited

U.S. PATENT DOCUMENTS

| | | | |
|---|---|---|---|
| 2007/0254648 | A1 | 11/2007 | Zhang et al. |
| 2008/0085707 | A1 | 4/2008 | Fadell |
| 2009/0221265 | A1* | 9/2009 | Liu et al. ............... 455/411 |
| 2009/0271852 | A1 | 10/2009 | Torres et al. |
| 2010/0263022 | A1 | 10/2010 | Wynn et al. |
| 2010/0279698 | A1* | 11/2010 | Wong ..................... 455/450 |
| 2011/0041167 | A1 | 2/2011 | Nguyen |
| 2011/0047603 | A1 | 2/2011 | Gordon et al. |
| 2011/0154454 | A1 | 6/2011 | Frelechoux |
| 2011/0165896 | A1 | 7/2011 | Stromberg et al. |
| 2011/0277019 | A1 | 11/2011 | Pritchard, Jr. |
| 2011/0294472 | A1* | 12/2011 | Bramwell et al. ...... 455/413 |

OTHER PUBLICATIONS

MobileIgnite, "Voice Call Handover Service: Functional Specification," Version 1.0, Sep. 21, 2006, Interoperability Group "Best Practices," pp. 1-52.

MobileIgnite Program-FAQ, "Mobileignite Adds Eight New Members," www.mobileignite.org/news/pr_012506.html, pp. 1-2.

P. Congdon et al., "IEEE 802.1X Remote Authentication Dial in User Service (RADIUS) Usage Guidelines," Network Working Group, Request for Comments: 3580, Sep. 2003, http://www.ietf.org/rfc/rfc3580.txt, pp. 1-30.

H. Haverinen (ed.) et al., "Extensible Authentication Protocol Method for Global System for Mobile Communications (GSM) Subscriber Identity Modules (EAP-SIM)," Network Working Group, Request for Comments: 4186, Jan. 2006, http://www.ietf.org/rfc/rfc4186.txt, pp. 1-92.

J. Arkko et al., "Extensible Authentication Protocol Method for 3rd Generation Authentication and Key Agreement (EAP-AKA)," Network Working Group, Request for Comments: 4187, Jan. 2006, http://www.ietf.org/rfc/rfc4187.txt, pp. 1-79.

B. Anton et al., "Best Current Practices for Wireless Internet Serivice Provider (WISP) Roaming," Wi-Fi Alliance-Wireless ISP Roaming (WISPr) Version: 1.0, Feb. 2003, pp. 1-37.

Wireless Broadband Alliance, "WISPr 2.0," Doc Ref. No. WBA/RM/WISPr Version 01.00, Apr. 8, 2010, pp. 1-58.

Wireless Broadband Alliance, "EAP over WISPr 2.0 Trial," Jun. 9, 2010, pp. 1-22.

3GPP Organizational Partners (ARIB, ATIS, CCSA, ETSI, TTA, TTC), "3rd Generation Partnership Project; Technical Specification Group Core Network and Terminals; Mobile Application Part (MAP) specification (Release 9)," 3GPP TS 29.002, V9.1.0, Mar. 2010, pp. 1-923.

European Telecommunications Standards Institute, "Digital cellular telecommunications system (Phase 2+); Specification of the Subscriber Identity Module-Mobile Equipment (SIM-ME) interface; (GSM 11.11)," GSM Technical Specification, Jul. 1996, Version 5.3.0, pp. 1-113.

"The implementa® Virtual SIM System for Carrier Class GSM Gateways," http://www.implementa.com, unnumbered pp. 1-30.

M. Kasper et al., "Subscriber Authentication in Cellular Networks with Trusted Virtual SIMS," 10th International Conference on Advanced Communication Technology, ICACT 2008, vol. 2, Gangwon-Do, Feb. 17-20, 2008, pp. 903-908.

European Telecommunications Standards Institute, "Digital cellular telecommunications system (Phase 2); Mobile Application Part (MAP) specification (GSM 09.02)," European Telecommunication Standard, ETS 300 599, Jan. 1997, 4th ed., pp. 1-400.

European Telecommunications Standards Institute, "Digital cellular telecommunications system (Phase 2); Mobile Application Part (MAP) specification (GSM 09.02)," European Telecommunication Standard, ETS 300 599, Jan. 1997, 4th ed., pp. 401-781.

\* cited by examiner

METHOD OF AND SYSTEM FOR DATA ACCESS OVER DUAL DATA CHANNELS WITH DYNAMIC SIM CREDENTIAL

RELATED APPLICATION(S)

This patent application claims priority under 35 U.S.C.§119(e) of the co-pending U.S. provisional patent application Ser. No. 61/534,230, filed Sep. 13, 2011, and titled "Method and System for Dual Data Channels with Dynamic SIM Credential," which is hereby incorporated by reference in its entirety.

FIELD OF THE INVENTION

This invention relates to communication systems and, more particularly, to wireless systems that authenticate access devices and provide network services via wireless networks.

BACKGROUND OF THE INVENTION

Mobile communication services are becoming more and more popular and, with the growth of smartphone devices and mobile Internet, the capability to access the Internet anywhere, anytime is critical for end users. This is especially true for those business travelers who require data access no matter whether they are, using their Home Public Mobile Network (HPMN) or Visited Public Mobile Networks (VPMNs).

When an end user uses the HPMN service, the HPMN provides the end user with a user credential, such as a Subscriber Identity Module (SIM) card for Global System for Mobile Communications (GSM) network. The SIM Card securely stores a secret key (Ki) identifying a mobile phone service subscriber, as well as subscription information, preferences, and other information. The SIM Card also securely stores programmable algorithms A3 and A8, which is the same logic as the A3/A8 algorithm stored in the mobile network's Home Location Register (HLR). The other most important information that the SIM Card stores is the international mobile subscriber identity (IMSI), which is used to uniquely identify the mobile phone service subscriber. The Ki is a 128-bit number paired with the IMSI when the SIM card is manufactured. It is only stored on the SIM card and at the HLR, and is never transmitted across the network on any link.

The SIM Card can be in other similar forms in different mobile networks. The equivalent component in Universal Mobile Telecommunications System (UMTS) networks is a Universal SIM (USIM) card, and in Code Division Multiple Access (CDMA) networks, the equivalent component is a Removable User Identity Module (R-UIM) card.

When a user travels abroad or enters into areas where the HPMN has no direct service coverage, the user can continue to access the service through the HPMN's roaming partners, the VPMNs, via roaming agreements with the HPMN, allowing the HPMN subscribers to use the VPMN's network service for the voice, SMS, and data using the same SIM card. However, the end user needs to pay roaming service fees to the HPMN when the end user uses the service via the VPMN, and the roaming charges are normally much higher, making the final cost of using the VPMN network comparatively expensive. Thus, usually the roaming subscriber of the HPMN will buy a new SIM card for a visited country/region he/she frequently visits and manually insert the new card when s/he enters the country or region. This is inconvenient and expensive.

U.S. Pat. No. 6,466,804 to Pecen, et al. titled "Method and Apparatus for Remote Multiple Access to Subscriber Identity Module" discloses providing multiple client devices in a GSM system remote multiple access to services of a server device. The server device has a single SIM card. Using Pecen's system, information from the server SIM card can be remotely accessed from the client devices over a network connection. But because the server SIM card is local to only a single area, the server provides cheaper local roaming costs in only that area. Furthermore, Pecen's system cannot tailor the roaming based on other service requirements.

There exist demands for alternative solutions that allow a user to efficiently continue to use a mobile service but with competitive low prices and guaranteed quality of service (QoS).

SUMMARY OF THE INVENTION

The present invention relates to enabling access to communication services using dynamically assigned user credentials, including multiple communication modules. In one embodiment, a first communication module establishes a communication connection with a first communication network (such as GSM, UMTS, CDMA, and LTE networks) using a real user credential (for example, SIM, USIM, or R-UIM cards or certificates). The first communication connection is used to request the dynamically assigned user credential from a remote management system and to register a second communication module into a second communication network. The second communication connection is then further tethered to allow other devices to access the Internet or other network connection.

Tethering is a feature provided by modern smartphone and tablet designs, with the aim of allowing the sharing of Internet connections with other devices such as laptops. Connection of the phone or tablet with other devices can be done over wireless LAN (Wi-Fi), over Bluetooth or by physical connections using cables such as Universal Serial Bus (USB) connectors. By introducing the tethering function into apparatus as one embodiment of the present invention, these embodiments remove the necessary changes to the user's existing devices, thus providing a broader and easy-to-use solution for the consumer market.

One embodiment of the invention includes a Portable Access Device with dual communication modules, in the foim of a General Packet Radio Service (GPRS) modem that supports GPRS networks, and other types of modems, such as UMTS modems for UMTS networks, CDMA1X/EV-DO modems for CDMA1X/EV-DO networks, LTE modems for LTE networks, and functionally equivalent modems for use in other types of networks. Those skilled in the art will appreciate that the communication modules inside the Portable Access Device are not necessarily the same model supporting the same network, The Portable Access Device also includes one valid SIM card provided by the end user's HPMN operator that is inserted into the first communication module, one Virtual SIM Card that is inserted into the second communication module and can be assigned dynamically with new SIM cards stored in the remote management system, one SIM Adapter to communicate with the remote management server, and a Wi-Fi/Bluetooth/USB chipset that serves as a means for tethering Internet connections for other user devices. The device also includes other components, such as a CPU, memory, a hard disk, a motherboard, a battery, a display, an input interface, a USB interface, and other components to form a portable and usable electronic apparatus.

Embodiments of the invention also include a Management Server that hosts multiple SIM Card boards. Each SIM card board has multiple SIM card slots, and each SIM card slot is inserted with an actual and valid SIM card each from a different mobile network operator. Altogether these SIM cards form a SIM card pool from which SIM Cards can be dynamically selected and assigned to the Portable Access Device according to the actual location and visited network information of the Portable Access Device.

One embodiment of the invention also includes client software (the "Connector") running on the Portable Access Device, The Connector manages the different data connections, including the first data connection via the first communication module, and the second data connection on a second communication module, as well as other tethering methods in the form of Wi-Fi, Bluetooth, a USB cable, and other components to share the first or second data communication connection. Embodiments of the invention also include Connector programming logic as a computer program running on the Portable Access Device to perform the following steps:

1. Registering into the first communication network with the first user credential via the first communication module;
2. Establishing the first communication connection with the first communication network using the first user credential;
3. Requesting a new user credential as a second user credential via the first communication connection from the remote management server;
4. Registering into the second communication network with the second user credential via the second communication module;
5. Establishing a second communication connection via the second communication connection with the second user credential; and
6. Tethering the second communication connection to share the second communication connection with other devices.

Another embodiment of the invention also includes software (the "User Manager") running on the server. The User Manager communicates with the Connector on the Portable Access Device to decide whether or not to allocate an actual SIM card in the pool to the virtual SIM card based on the device's current location information. The User Manager also drives the SIM Board and SIM Adapter inside the Management Server to facilitate the SIM card authentication and ciphering procedure, which is converted between the physical electrical data with the actual SIM card and a TCP/IP based protocol with the remote SIM Adapter inside the Portable Access Device, and subsequently successfully registers the Portable Access Device with the remote SIM card into the corresponding wireless network.

DETAILED DESCRIPTION OF THE DRAWINGS

Figure 1:
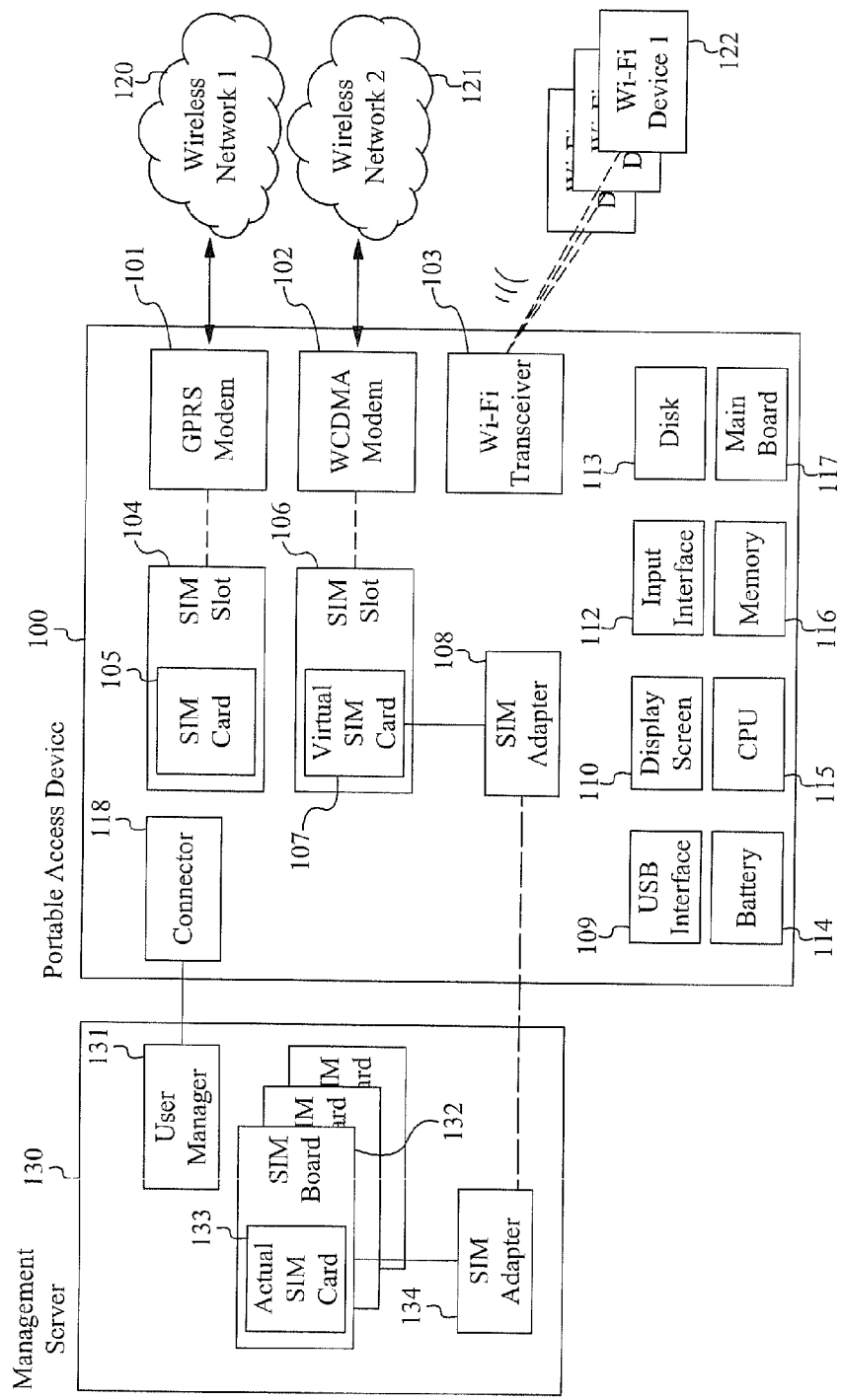
FIG. 1 shows the components of a system for dynamically assigning a credential for providing a network connection to one or more mobile devices in accordance with one embodiments of the present invention.

The principles of the invention will be described with particular reference to numerous exemplary embodiments. However, it should be understood that these embodiments show only a few examples of the advantageous uses realized using the principles of the invention. In general, statements made in this application do not necessarily limit any of the various claimed aspects of the present invention. Moreover, some statements may apply to some inventive features but not to others. In the drawings, like or similar elements are designated with identical reference numerals throughout the several views.

FIG. 1 is a block diagram of a Portable Access Device 100 and a Management Server 130, in accordance with one embodiment of the invention, communicating with wireless networks 120 and 121 and providing services for Wi-Fi devices 122. The Portable Access Device 100 is a small electronic apparatus that is easy to carry and use. The Portable Access Device 100 includes two multiple data communication modems, a GPRS Modem 101 and a WCDMA Modem 102, used to communicate with various wireless networks, such as the networks 120 and 121. The modems 101 and 102 are exemplary modems equipped in the Portable Access Device 100. Those skilled in the art will appreciate that other types of modems, such as CDMA1X/EV-DO modems for communication with CDMA1X/EV-DO networks, LTE modems for communication with LTE networks, and functionally equivalent modems for use in other types of networks, can also be used in accordance with the principles of the invention.

Generally, a SIM Slot is associated with each corresponding modem 101 and 102 for the modem to be registered into the corresponding wireless network. For example, the Portable Access Device 100 also includes SIM Slots 104 and 106. The SIM Slot 104 is associated with the GPRS Modem 101, and the SIM Card 105 is inserted into the SIM Slot 104. Once the GPRS Modem 101 is triggered by the system, for example, by the Connector 118, the GPRS Modem 101 can use the SIM Card 105 to register into the first Wireless Network 120 and get corresponding data connection service.

The SIM Card 105 "registers into" the wireless network 120 by, for example, transmitting information that identifies the SIM Card 105 to the wireless network 120, so that the wireless network 120 can authenticate the SIM Card 105 and complete the registration process. The Portable Access Device 100 is now able to access the wireless network 120 and function as an access point for other devices accessing the wireless network 120. Those skilled in the art will recognize that the actual registration process depends on the type of network 120.

The SIM Slot 106 is associated with the WCDMA Modem 102, but instead of having a valid SIM card inserted into the SIM slot 106, a Virtual SIM Card 107 is inserted into it. The Virtual SIM Card 107 is connected with a SIM Adapter 108. Unlike a regular SIM card that can directly interface with a modem using electrical signaling for the authentication procedure, the SIM Adapter 108 together with Virtual SIM Card 107 converts the electrical signaling into a TCP/IP based protocol and communicate with a remote SIM Adapter 134 on a Management Server 130 (discussed below), thus appearing to the WCDMA Modem 102 as a local SIM card. In fact, the actual SIM card is on the remote Management Server 130 and can be assigned from a pool of SIM cards dynamically according to specific service requirements.

The Portable Access Device 100 also comprises a Wi-Fi Transceiver 103 for tethering the data connection over Wi-Fi to share the Internet connections with other user devices such as laptops, personal digital assistants (PDAs), and other electronic devices, thereby turning the Portable Access Device 100 into a portable wireless access point and router for devices connected to it. Though the Portable Access Device 100 includes a Wi-Fi Transceiver 103, those skilled in the art will recognize that other communication modules can be used instead of or in combination with the Wi-Fi Transceiver 103. For example, the Wi-Fi Transceiver 103 can be replaced or combined with add-on modules such as a Bluetooth module, a USB cable, or similar modules. In this way, the Portable Access Device 100 can tether the Internet connections over multiple channels such as Wi-Fi, Bluetooth, USB cables, or any other wireless or wired connections. Like regular electronic apparatus, the Portable Access Device 100 also comprises a Universal Serial Bus (USB) interface 109 for tethering the Internet connection and also for management from a laptop or other electronic device, a Display Screen 110 to display the working status of the Device 100, an Input Interface 112 to receive user commands, a hard disk 113 to store operation system files, drivers and associated configuration, settings and so on, a Battery 114 to provide the electronic power for the Device 100, a CPU 115 for executing or running the system, a Memory 116 for use by the executing programs, and a Main Board 117 (e.g., a printed circuit board or PCB) to hold the above mentioned components. These components are listed merely for illustration of one embodiment. Those skilled in the art will recognize that the Portable Access Device 100 can include a subset of the components described, additional components, or any combination thereof.

Still referring to FIG. 1, the Management Server 130 manages the SIM cards that it hosts. The Management Server 130 communicates with the Portable Access Device 100 and any similarly configured portable access devices for user management and SIM card assignment. The Management Server 130 includes a User Manager 131, which in one embodiment is a software-based component that communicates with the Connector 118 inside the Portable Access Device 100, and manages the SIM cards to allocate the suitable SIM card to each Portable Access Device 100. The Management Server 130 also includes one or more SIM Boards such as a SIM Board 132. The SIM Board 132 is a SIM card container that can hold multiple actual SIM Cards 133. The number of actual SIM Cards that the SIM Board 132 can contain varies and is determined by the model of the SIM boards. SIM Boards used in accordance with embodiments of the invention can contain any number of SIM Cards, such as 1, 16, 32, more, preferably from different mobile operators.

The SIM Board 132 also includes a SIM Adapter 134, which is the counterpart of the SIM Adapter 108 inside the Portable Access Device 100. The SIM Adapter 134 can convert the TCP/IP based communication protocol into electrical signaling to interface with an Actual SIM card for the authentication procedure, and convert the electrical based response back into a TCP/IP based response to the Portable Access Device 100.

Figure 2:
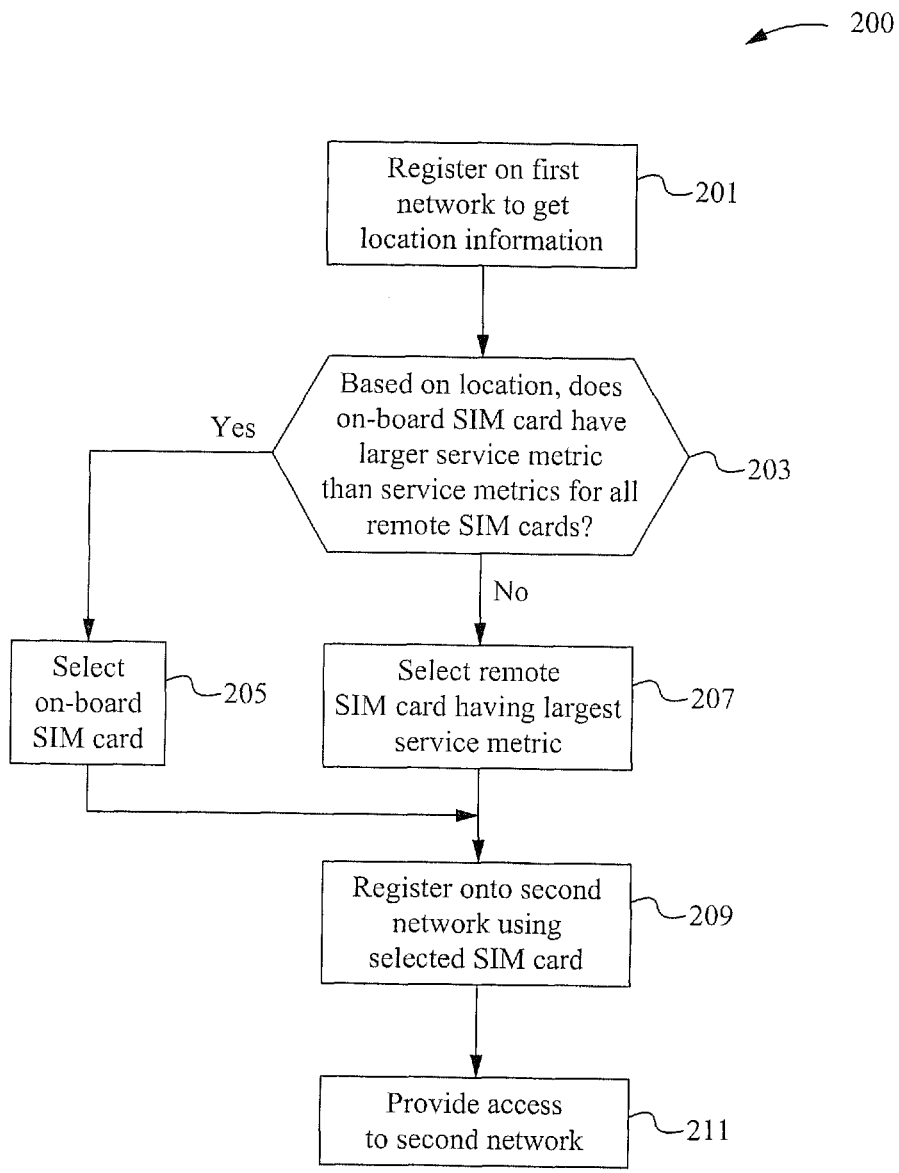
FIG. 2 is a flowchart of a high-level process for assigning a credential to a portable access device to provide access to a network in accordance with one embodiment of the invention.

FIG. 2 is a high-level flow chart showing the steps of a process 200 for a portable access device providing services to one or more mobile devices in accordance with one embodiment of the invention. The portable access device functions as a wireless access point, providing client devices access to a network, such as the wireless network 121. The portable access device contains an on-board SIM card. Referring to FIG. 2, in the step 201, the portable access device registers into a first network to get location information about the portable device. Next, in the step 203, based on the location information, the process compares service metrics for accessing a second network using the on-board SIM card versus using other SIM cards from a pool of SIM Cards available to the portable access device. Service metrics include, for example, cost, data speed, or some other metric. The service metric can be any metric tailored to suit the application at hand. The SIM card with the best service metric, represented by the largest value, (e.g., lowest cost for accessing the second wireless network, supports faster data speeds on the second wireless network, etc.) is dynamically selected. In some situations, the on-board SIM card has an associated service metric that is better than the service metrics of all the SIM cards from the pool of SIM cards. In that case, the process proceeds to the step 205, where the on-board SIM card is the "selected" SIM card. From the step 205, the process continues to the step 209.

If in the step 203 it is determined that the on-board SIM card does not have the best service metric from among the SIM cards in the pool of SIM cards, the process proceeds to the step 207. In the step 207, the process selects the SIM card from the pool of SIM cards with the best service metric. From the step 207, the process proceeds to the step 209, where the portable access device registers into the second wireless network using the selected SIM card for authentication and registration purposes. From the step 209, the process proceeds to the step 211, where the portable access device provides other devices (wireless, wired, or both) access to the second wireless network. Because the service is associated with a SIM card having a superior metric, the client devices get superior performance, such as by reduced charges, faster speeds, etc.

In one embodiment, the Portable Access Device 100 stores a table containing different service metrics for the SIM card 105 and for each of the SIM cards from the pool of SIM Cards contained in the Management Server 130. In another embodiment, this table is stored on the Management Server 130. This table is used to determine a "selected" SIM card based on comparative service metrics, such as described above. Those skilled in the art will recognize other locations for storing a table mapping SIM Cards to service metrics.

In one embodiment, in the step 209, the portable access device is registered into the network using both the on-board SIM card and the SIM card selected from the pool of SIM cards. In this way, the portable access device sets up the communication paths to the second wireless network.

In one embodiment, the first wireless network is a totally different network from the second wireless network with regard to the network operators, technologies, frequencies, etc. In another embodiment, the first wireless network is the same network as the second wireless network, a scenario that most likely occurs when it is a VPMN network for the first SIM Card 105, and a HPMN network for the second SIM Card 133 that is dynamically allocated from remote SIM Card pool in the Management Server 130.

Figure 3:
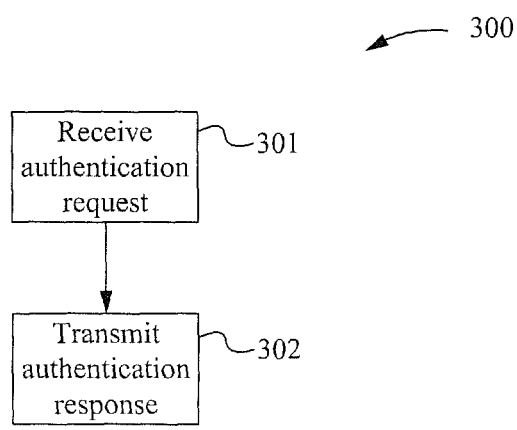
FIG. 3 is a flowchart of a high-level process for transmitting an authentication response for a credential dynamically selected from a pool of credentials in accordance with one embodiment of the invention.

FIG. 3 is a high-level diagram showing the steps of a process 300 for assigning a SIM Card from the pool of SIM Cards based on service metrics in accordance with one embodiment of the invention. Referring to FIGS. 1 and 3, the Portable Access Device 100 has already selected a specific SIM card from the pool of SIM cards on the Management Server 130 based on a superior service metric, such as discussed above. In the step 301, the Management Server 130 receives an authentication command. In the step 302, the Management Server 130 transmits an authentication response. The authentication procedure follows the European Telecommunications Standards Institute (ETSI) specifications GSM 11.11 for the interface with the SIM cards. In one embodiment with SIM Card as the example, the Management Server 130 passes the authentication parameters to the SIM card, including the RAND value as the key challenge parameter provided by the wireless network 121. The SIM card then calculates a 32-bitSigned Response (SRES) value based on the stored Ki, A3 encryption algorithm, as well as the RAND value, and then sends the SRES value back to the Management Server 130, which then further passes the SRES value to the Portable Access Device 100 over the wireless data connection.

Figure 4:
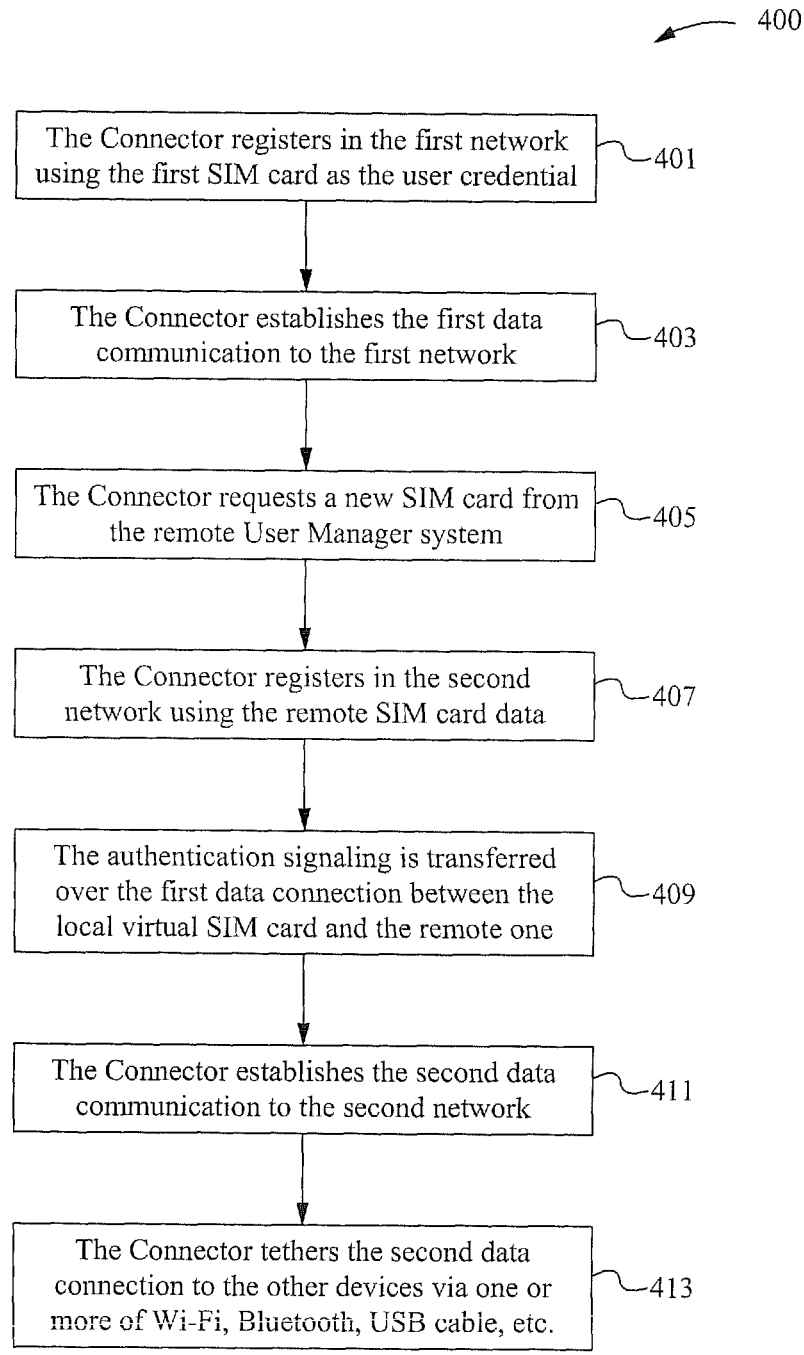
FIG. 4 shows the steps of a process for providing access to a network using a dynamically assigned SIM credential with two data network connections in accordance with one embodiment of the invention.

FIG. 4 shows more detailed steps of a process for accessing a network using a dynamically assigned SIM credential according to a preferred embodiment of the present invention. Referring to FIGS. 1 and 4, the Connector 118 running on the Portable Access Device 100 triggers the step 401 once the Connector 118 receives a command triggered by the user. In the step 401, the Connector 118 registers into the wireless network 120 by driving the GPRS Modem 101 and using the actual SIM card 105 to pass the authentication procedure. The actual SIM card 105 is provided by the user's HPMN, which has a service relationship with the wireless network 120. Upon successfully registering into the network 120, in the step 403 the Connector 118 establishes data communication with the wireless network 120. The data connection is over the GPRS connection created by the GPRS modem 101, and provides the Internet connection to the Management Server 130. Once the Connector 118 connects with the Management Server 130 over the data connection to the wireless network 120, in the step 405 the Connector 118 requests the User Manager 131 to assign a SIM card to the Portable Access Device 100 using information similar to that in the first SIM card, information such as IMSI, MSISDN, or functionally similar information. The User Manager 131 assigns the corresponding SIM card (e.g., SIM Card 133), and returns the response to the Connector 118 via the first data communication.

Upon a successful response message, in the step 407 the Connector 118 drives the second data communication module (e.g., the WCDMA Modem 102) to register into the second wireless network 121 using the dynamically assigned SIM Card information. The WCDMA Modem 102 then starts the authentication procedure with the wireless network 121, and, in the step 409, the standard SIM card authentication and ciphering procedure is performed. However, because the Virtual SIM Card 107 is inserted into the SIM Slot 104, the regular physical data exchange of authentication and ciphering between the modem 102 and the SIM Card 107 using the GSM 11.11 protocol is converted into a TCP/IP based protocol by the SIM Adapter 108 and transmitted to the remote SIM Adapter 134 over the first data communication connection, which is then in turn transmitted to the SIM card (e.g., SIM Card 133) insider the SIM Board 132.

In one embodiment, the SIM Card 107 is "virtual" in that, though it is not physically located in the SIM Slot 106, it is made to appear to be physically located in the SIM Slot 106. The SIM Card 107 is an empty card without any network or subscriber identity data stored inside, including the integrated circuit card identifier (ICCID), IMSI, Authentication Key (Ki), Local Area Identity (LAI) and other Operator-Specific numbers, such as Emergency Number, SMSC Addresses, etc. In one embodiment, the data and the authentication procedure are achieved by using a physical board that passes authentication requests and responses between the SIM cards on the SIM Board 132 and the modem 102, as described above. In this way, the second wireless network 121 considers that the authentication requests are routed to and received from a SIM board in the SIM Slot 106. After reading this disclosure, those skilled in the art will recognize other ways of providing a virtual SIM card or other credential.

After the successful authentication of the dynamically assigned SIM Card on the remote Management Server 130, in the step 411 the WCDMA Modem 102 is granted access rights to the wireless network 121. Thus the Connector 118 continues to establish second data communication to the wireless network 121. Once the data connection is set up, the Portable Access Device 100 has 2 data connections to the wireless network 121 that can be connected with the Internet or other networks. The system can select between the two connections based on considerations such as cost, as the first connection is more likely to be a roaming connection with a more expensive charging rate, while the second connection is a local connection with a lower rate.

The Connector 118 maintains the 2 connections, and in the step 413 it tethers the selected connection over Wi-Fi, Bluetooth, a USB Cable, or any other type of connection, to share the Internet connection with other user devices, such as laptops, smartphones, PDAs, cameras, or functionally similar devices. The laptops, smartphones, PDAs, cameras or other functionally similar devices can now access the wireless network 121 over the Portable Access Device 100.

In another embodiment, the system maintains only one connection to the network 121, such as the cheapest connection using a SIM Card that is local to the mobile operator servicing the network 121.

Preferably, the Connector 118 is programmed with intelligence to determine the different usage rates of the 2 SIM Cards (the actual SIM Card 105 inside the Portable Access Device 100 and the Virtual SIM Card 107 dynamically assigned by the remote Management Sever 130) with the available network operators, and selects the most cost-effective way for the setup of network connections. For example, in one embodiment in which only one connection is maintained, if the rate of a connection using the actual SIM Card 105 is cheaper, which is typical for domestic/local use, the Connector 118 does not need to request the remote Server 130 to assign a new SIM card from the pool. The Connector 118 can tether to share the first data connection directly.

In one embodiment, the Management Server 130 determines whether to assign a Virtual SIM Card to the Portable Access Device 100 and selects an Actual SIM Card from the pool of SIM Cards on the SIM Card Board 132 for this purpose. In another embodiment, the Portable Access Device 100 performs these steps. Those skilled in the art will recognize that these steps can be performed by different components and divided among different components.

In one embodiment, the steps of the processes shown in FIGS. 2-4 are stored as instructions on one or more computer-readable media for execution by one or more processors. In one embodiment, the computer-readable medium and corresponding processor for executing the processes shown in FIGS. 2 and 4 are stored on the Portable Access Device 100, and the computer-readable medium and corresponding processor for executing the process shown in FIG. 3 are stored on the Management Server 130.

Figure 5:
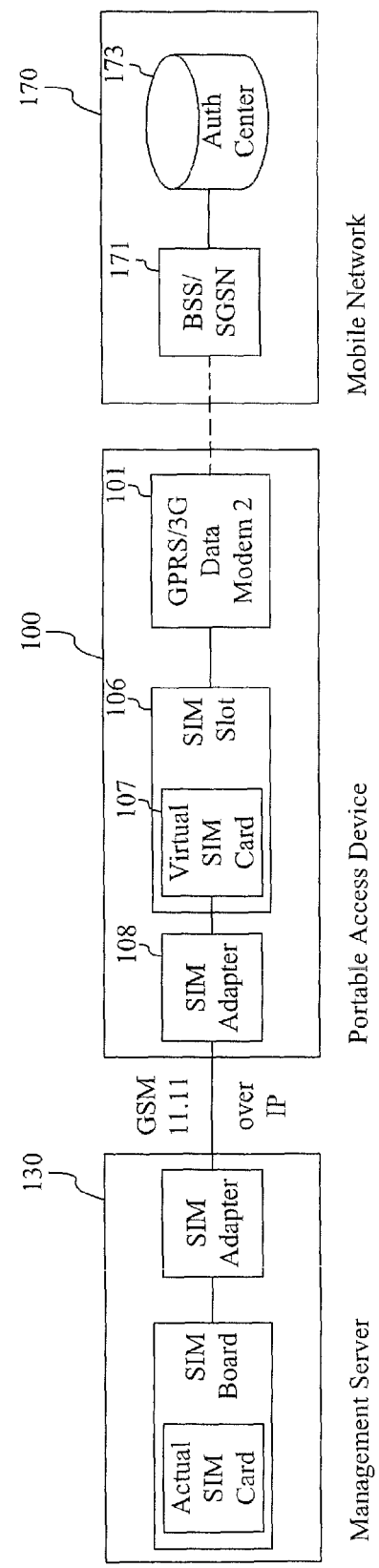
FIG. 5 is a high-level block diagram of a system for the authentication procedure using the dynamically assigned credentials in accordance with one embodiment of the invention.

FIG. 5 is a high-level block diagram of the components of a system for the remote authentication procedure with the dynamically assigned user credential in accordance with one embodiment of the invention. The system includes the Management Server 130 coupled to the Portable Access Device 100, which in turn is coupled to a mobile network 170. The mobile network 170 includes a Base Station Subsystem/Serving GPRS Support Node (BSS/SGSN) 171 coupled to an Authentication Center (AuC) 175. During the authentication procedure, the BSS/SGSN 171 gets multiple sets of random RAND values and corresponding SRES values from the AuC 175, and then challenge the GPRS Data Modem 101 with the RAND value. The RAND value is then transferred through the Virtual SIM Card 107 and SIM Adapter 108. The RAND value is further transmitted to the Management Server 130. The Management Server 130 follows the European Telecommunications Standards Institute (ETSI) specifications GSM 11.11 for the interface with the SIM cards. In one embodiment with SIM Card as the example, the Management Server 130 passes the authentication parameters to the SIM card, including the RAND value as the key challenge parameter provided by the wireless network 121. The actual SIM card then calculates a 32-bit Signed Response (SRES) value based on the stored Ki, A3 encryption algorithm, as well as the RAND value, and then sends responses back to the Management Server 130. The responses are then further passed to the Portable Access Device 100 over the wireless data connection. The SRES value is further transmitted to the BSS/SGSN 171, where it is compared with the SRES value returned by the AuC 175. If the 2 SRES values match, then the BSS/SGSN 171 finishes the authentication procedure, and allows the Portable Access Device 100 to access its network services; otherwise, the access would be denied directly.

Those skilled in the art will appreciate that the concepts described herein with reference to SIMs, may also be applied to other forms of valid and commonly used user credentials, such as USIM cards and R-UIM cards, to name only two such credentials. Furthermore, the invention is not limited to tethering and sharing network connections with other user devices. Various modifications can be made to the embodiments of the invention to expand its practical uses. As one example, besides tethering the network connection, the Portable Access Device 100 can also offer Voice, Short Message Services, Multimedia Message Services, or other service capabilities over the dynamically assigned SIM cards, which are charged lower service charges, thereby reducing costs for the device owner. As another example, while FIG. 1 shows tethering two wireless networks, the principles of the invention can be applied to tether to any number of networks.

The present invention has been described above with reference to exemplary embodiments. It will be apparent to those skilled in the art that various modifications may be made to the embodiments without departing from the spirit and scope of the invention as defined by the appended claims.

We claim:

1. A method of providing communication services to one or more mobile devices comprising:
    registering into a first communication network using a first user credential to determine user location information and establishing a first data communication connection;
    utilizing the first data communication connection to set up an IP connection with a user credential management server; requesting a second user credential from among a pool of user credentials based on the location information; registering into a second communication network using the second user credential and establishing a second data communication connection, wherein registering into the second communication network using the second user credential comprises authenticating the second user credential with the second communication network and associating the second user credential with a portable device, thereby allowing the portable device to make connections between the one or more mobile devices and
    the second communication network; and tethering the one or more mobile devices to the second communication network using one or more connections established using the second user credential
    wherein the first and second user credentials have corresponding first and second service metrics associated with the user location information, the method further comprising requesting the second credential only when the second service metric is larger than the first service metric.

2. The method of claim 1, wherein a larger service metric corresponds to a lower cost for accessing the second network.

3. The method of claim 1, wherein a larger service metric corresponds to a faster data rate on the second network.

4. The method of claim 1, further comprising receiving the second user credential from a source that hosts the pool of user credentials.

5. The method of claim 1, wherein one or both of the first and second communication networks comprise a GSM network, a UMTS network, a CDMA network, or an LTE network.

6. The method of claim 1, wherein one or both of the first and second user credentials comprise a SIM card, a USIM card, or an R-UIM card.

7. The method of claim 1, further comprising receiving the second user credential using an Internet protocol.

8. The apparatus of claim 1, wherein the tethering is performed over a Wi-Fi connection, a Bluetooth personal area network (PAN) connection, or a USB connection.

9. The method of claim 1, wherein the tethering is over a data access connection that provides the one or more mobile devices access to Internet, one or more public networks, one or more private networks, or any combination thereof.

10. The method of claim 1, wherein the portable device comprises a virtual credential configured to transmit authentication requests and responses between the user credential management server and a mobile operator for the second communication network, thereby registering the second user credential on the second communication network.

11. The method of claim 1, wherein the one or more mobile devices comprise multiple mobile devices.

* * * * *